United States Patent

[11] 3,618,804

[72] Inventor Werner A. Krause
 West Hartford, Conn.
[21] Appl. No. 867,778
[22] Filed Oct. 20, 1969
[45] Patented Nov. 9, 1971
[73] Assignee General Electric Company

[54] CONCEALED TRIM CLAMP FOR ELECTRICAL PANELBOARDS AND OTHER WIRING CABINETS
4 Claims, 5 Drawing Figs.

[52] U.S. Cl............................................ 220/3.8,
 49/169, 174/50, 174/66, 220/24.3, 292/301,
 292/341.18, 317/120
[51] Int. Cl........................................... H02g 3/08
[50] Field of Search........................................ 220/3.8,
 3.7, 38, 41, 55 J; 174/48, 50, 66, 67; 317/117, 120;
 49/169, 171, 463, 465; 292/300, 301, 341.18

[56] References Cited
UNITED STATES PATENTS

| 288,189 | 11/1883 | Sparks............................ | 292/300 |
| 946,646 | 1/1910 | Pratt................................ | 220/3.8 |
| 1,087,551 | 2/1914 | Reed................................ | 292/300 |
| 1,653,293 | 12/1927 | Kendall........................... | 220/38 |
| 2,630,235 | 3/1953 | Beber et al...................... | 220/3.8 |
| 3,465,914 | 9/1969 | Pierson, Jr...................... | 220/24.3 |

Primary Examiner—Joseph R. Leclair
Assistant Examiner—James R. Garrett
Attorneys—Robert S. Smith, Robert T. Casey, D. M. Schiller, Frank L. Neuhauser, Oscar B. Waddell and Joseph B. Forman ABSTRACT: A concealed front cover or "trim" fastener for electrical panelboards or other wiring cabinets comprising four hooks fixedly attached to the inside of the front cover. Four support arms or brackets are attached to the inside of the panelboard or cabinet and have bent-over portions onto which the hooks of the front cover may be placed to support the front cover. The support arms are slidably adjustable in a direction perpendicular to the plane of the front cover (i.e., toward and away from the backwall of the cabinet). In one form, the cover is substantially larger than the cabinet, and when the cabinet is recessed into a wall, the outer edges of the front cover overlie peripheral portions of the wall and the cover is spaced away from the cabinet slightly. The support arms are drawn out to accommodate this spacing, and then fixed in place, such as by a nut and bolt. A locking screw mounted on a fixed portion of the cabinet is advanced after the front has been mounted in place and engages a bracket fixedly carried by the front cover and prevents the front cover from being raised so as to disengage the hooks from the adjustable support arms, thereby locking the front in place.

PATENTED NOV 9 1971

INVENTOR
WERNER A. KRAUSE

BY Robert S. Smith

ATTORNEY

PATENTED NOV 9 1971 3,618,804

INVENTOR
WERNER A. KRAUSE

BY Robert L. Smith

ATTORNEY

3,618,804

CONCEALED TRIM CLAMP FOR ELECTRICAL PANELBOARDS AND OTHER WIRING CABINETS

BACKGROUND OF THE INVENTION

1. Field of the Invention

My invention relates to electrical equipment enclosures, and more particularly to an improvement in electrical circuit breaker panelboards of the type comprising a box for housing the electrical components. Such boxes are often mounted in an opening in a supporting surface which is frequently a wall, and a front cover panel or "trim" is detachably fastened to the open side of the box, with portions overlying the surrounding portions of the wall.

2. Description of the Prior Art

In accordance with the prior art, a variety of different types of fastening means have been utilized for the purpose of attaching a front panel to a box or enclosure. For example, with small electrical enclosures of the type commonly mounted on a surface of a wall, it is customary to attach the front cover to the box by means of simple screw fasteners inserted through holes in the trim which engage tapped holes in flanges carried by the box. Although this particular means of fastening the front cover to the box will generally suffice when used with small enclosures mounted on the surface of a wall, it presents problems when used with larger box enclosures and also when different mounting conditions are encountered. Thus, as the size of the enclosure increases, there is a corresponding increase in the size and weight of the front cover, and it is difficult to hold such cover vertically in place during the process of installation while the requisite number of screw fasteners are installed. Another situation often incurred, in which the use of simple screw fasteners has proven unsatisfactory, is where the box has been in a recess in a wall so that its outer surface is behind the plane of the outer surface of the wall. In this situation it is difficult to get the screw fasteners to engage the tapped hole in the flanges of the box enclosure. In addition, the use of such screw fasteners ignores a potential safety hazard in that such means are readily accessible from the exterior of the panelboard or electrical control box. As a consequence, even though the door provided in the front for the purpose of gaining access to the interior of the panelboard may be locked, there is nothing to prevent removal of the front of the box by loosening the screw attaching means and thereby gaining access to the electrical equipment housed therewithin. This is objectionable wherever the panelboard is exposed to vandals or persons who would not take the requisite care required around electrical circuitry.

One approach which has been taken by the prior art in an attempt to eliminate such problems involves an adjustable latch member such as that described in U.S. Pat. No. 3,116,081 issued Dec. 31, 1963 to L. C. Goodridge and assigned to the assignee herein. The latch members which engage the flanges of the box are operated by means of screws through the front cover. A disadvantage of using this particular type of cover-attaching means is that to install the trim the latch members must be backed off sufficiently to clear the flanges of the box. As the latch members are tightened they may catch electrical wiring within the enclosure, inhibiting further operation and possibly damaging the wires. In addition, the operating means for the fastener is a screw head located on the outside of the panel where it is accessible and as in all such structures which utilized screw fasteners, it tends to detract from the appearance of the product.

For these reasons, front fasteners have been developed which are not accessible when the door in the front is closed. Two forms of such "concealed" front fasteners or clamps are illustrated and described in U.S. Pat. No. 3,465,914, Pierson, and application U.S. Pat. No. Ser. No. 739,250, Goodridge, filed June 24, 1968, now Pat. No. 3,480,344 issued Nov. 25, 1969, both assigned to the assignee herein. Pierson discloses a concealed trim clamp including a clamp member pivotally mounted on a bracket on the inside of the front cover and having a nut pivoted thereon which receives the end of an elongated screw, the head of the screw being accessible for operation only when the door is open. Goodridge shows a concealed fastener comprising a clamping arm pivotally supported on a bracket carried by the inner surface of the front cover adjacent the door opening and an operating member pivotally supported on the inner surface of the front cover for operating the clamping member to and away from a clamping position against a flange of the panelboard enclosure.

OBJECTS OF THE INVENTION

It is an object of the invention to provide an equipment enclosure of the type referred to which includes front panel clamps which are visible and accessible only when the door in the front panel is open. It is another object of the invention to provide an improved concealed front fastener for electrical panelboards for use in attaching a front to a panelboard whereby the front is attached to a box so that the front cannot be removed when the door is closed.

A still further object of the present invention is to provide such a concealed front fastener for electrical panelboards which simplifies the task of attaching the front to the panelboard box while yet insuring a secure connection between the front and the box.

Another object of the present invention is to provide such a concealed front fastener for electrical panelboards wherein the use thereof automatically provides alignment between the front and the panelboard box, and also provides adjustment for a substantial amount of misalignment between the box and the sidewall portions of the opening in the wall on which the box is supported.

Still another object of the invention is to provide locking means in conjunction with a securing means that is strong enough to prevent forcing open the front by anything less than drastic measures which would destroy the front itself.

Another object is to provide a structure having a minimum number of simple parts to maximize reliability and minimize manufacturing costs.

SUMMARY OF THE INVENTION

In accordance with the present invention, there is provided an electrical equipment enclosure including housing having a back wall and sidewall, and a separate detachably mounted front closure member or trim having a door therein. A plurality of hook members are fixedly secured to the back side of the front cover. A corresponding number of adjustable support arms are attached to the inside of the box where they may be positioned toward or away from the open front wall of the box. The hooks are provided with a tapered portion engaging the adjustable support arms and providing a positive connection therebetween. Blocking means is provided to force the front panel hook members against the adjustable support arms to further insure a continuing positive connection therebetween.

The invention will be more fully understood from the following detailed description and its scope will be pointed out in the appended claims.

DESCRIPTION OF A PREFERRED EMBODIMENT

Figure 1:
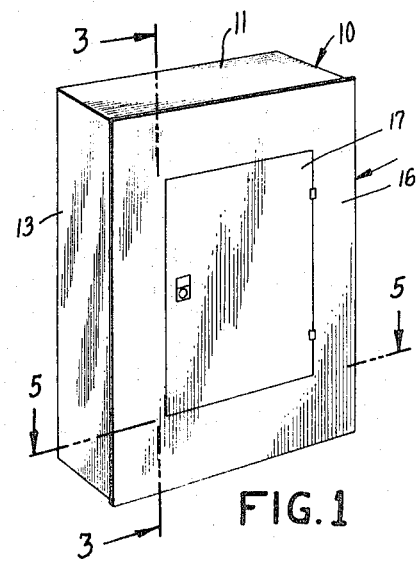
FIG. 1 is a perspective view of an electrical panelboard having concealed front fasteners in accordance with the present invention.
Figure 2:
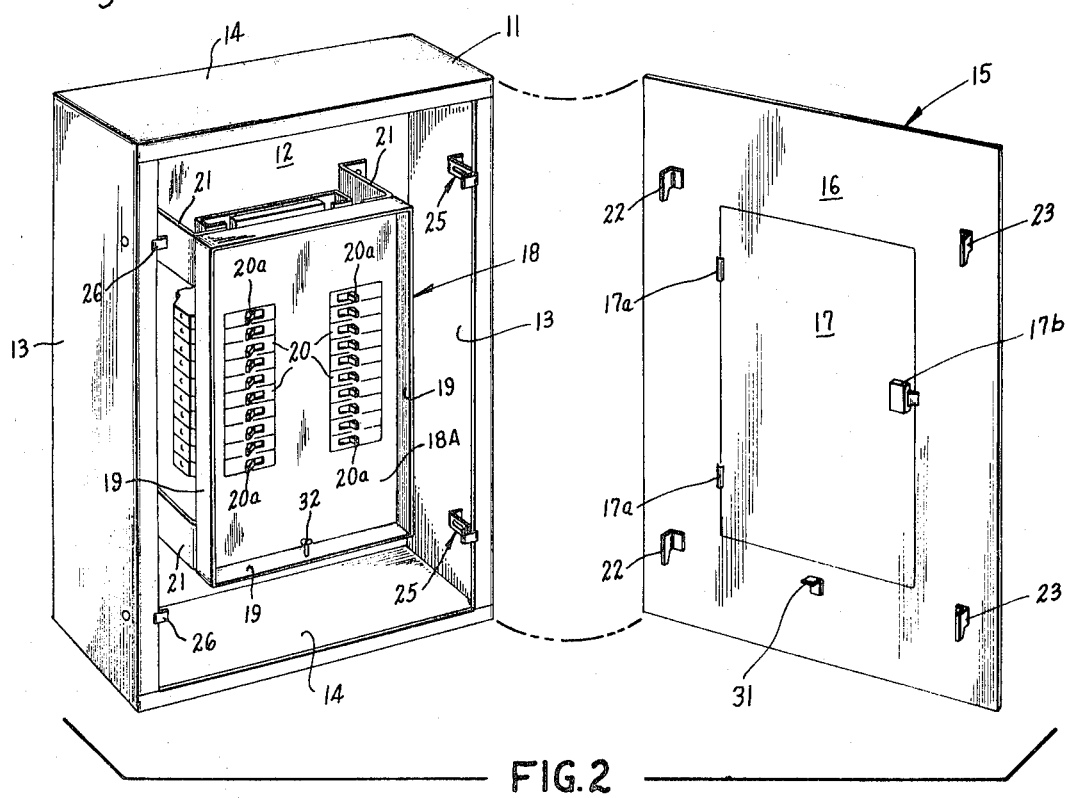
FIG. 2 is a perspective view of the panelboard of FIG. 1 with the front removed.

Referring to FIGS. 1 and 2, the invention is shown as incorporated in electrical circuit breaker panelboard enclosure 10. The enclosure 10 includes a housing 11 comprising a back wall 12, a pair of sidewalls 13 and end walls 14, and a front closure means 15, comprising a front cover or trim panel 16 having an openable door 17. The openable door 17 is retained by hinges 17a and a locking latch 17b.

Supported within the interior of the housing 11 is an inner cover plate 18 which has a base portion 18A and upstanding flange portions 19. The base portion 18A is provided in a manner well known in the art with openings or knockouts (not shown) adapted to receive raised portions of the circuit breakers 20 so as to render the circuit breaker operating handles 20a accessible for manual operation when the door 17 of the trim panel 16 is open. The inner cover plate 18 may be supported within the housing 11 in any suitable manner such as a plurality of brackets 21.

Figure 4:
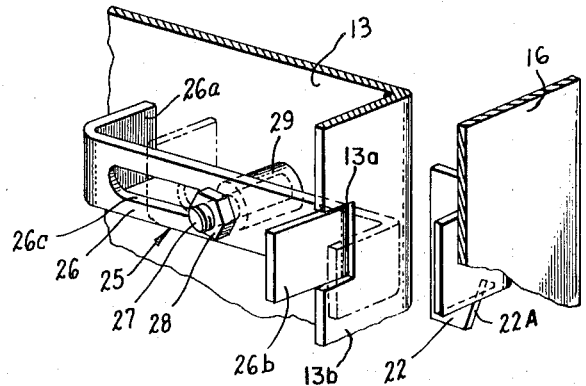
FIG. 4 is a fragmentary perspective view on an enlarged scale of a single concealed front fastener and an adjustable support bracket showing alternate positions of the bracket.
Figure 5:
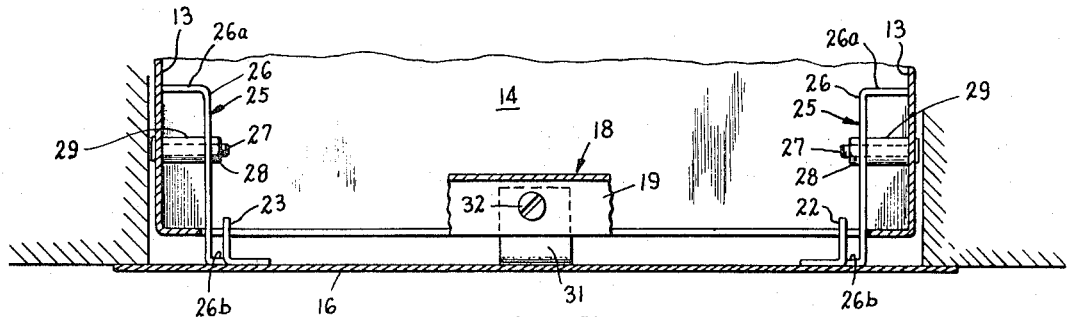
FIG. 5 is a view in section along the line 5—5 of FIG. 1.
Figure 3:
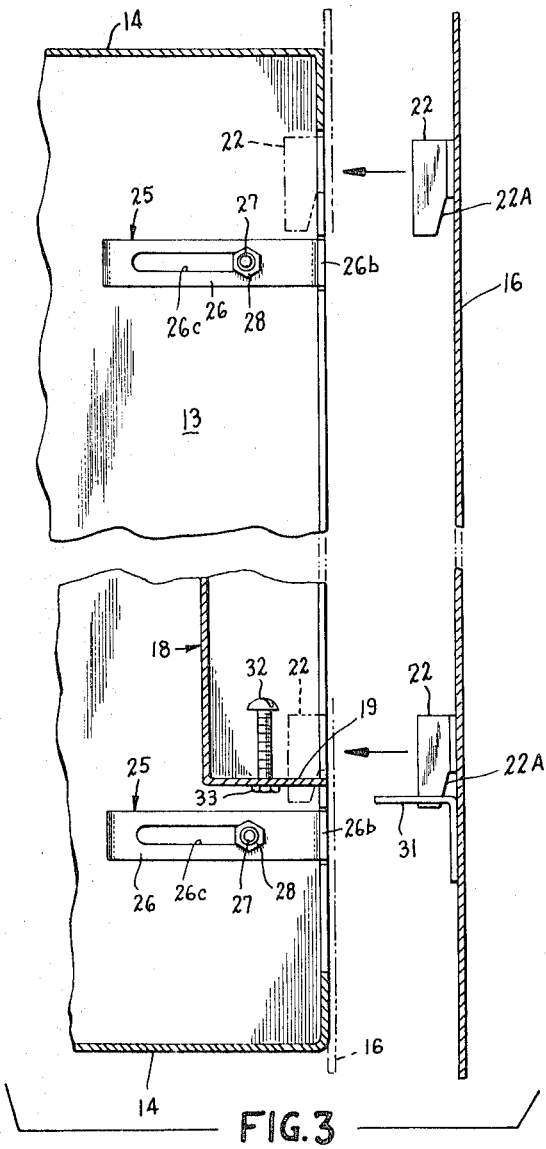
FIG. 3 is a view in section along the line 3—3 of FIG. 1 with the cover in exploded relation.

The trim panel 16 is detachably secured to the housing 11 by means of a plurality of hook members 22 and 23 which are mirror images of each other. In the preferred embodiment two hook members 22 and two hook members 23 are provided with the former being adjacent one sidewall 13 and the latter adjacent the opposed sidewall 13. The construction of each of the hook members 22 and 23 is substantially identical and referring to FIGS. 3, 4, and 5, comprises a generally L-shaped piece having a tapered portion 22A extending generally perpendicular to the plane of the front cover or trim panel 16.

The hook members 22 and 23 each engage a corresponding adjustable support bracket 25 which comprises a member 26 of elongated sheet metal construction having end flanges portions 26a and 26b and an elongated slot 26c which accommodates a bolt 27 which together with a nut 28 and a sleeve 29 secure the member 26 to the sidewall 13. The mounting of each of the adjustable support brackets 25 is substantially identical except that the member 26 is reversed from the left side of the enclosure 10 to the right side as viewed.

A locking means is provided to secure the hook members 22 and 23 against the adjustable support brackets 25. In the preferred embodiment, the locking means comprises an L-shaped bracket 31 fixedly carried by the inner surface of panel front 16, and a machine screw 32 supported in threaded engagement by nut 33 fixedly attached to upstanding flange portion 19 of housing 11.

To assemble the trim panel 16 on the housing 11 in the case wherein the enclosure 10 is surface mounted (mounted on a wall surface) rather than a flush mounted (recessed within a wall), the support brackets 25 do not have to be adjustable, and they may instead be fixedly secured to the sidewalls 13 in a predetermined position to provide proper relation between the trim panel 16 and the housing 11. In that case, it is only necessary to engage the hooks 22 and 23 with the corresponding bracket flange portions 26b and turn machine screw 32 to positively force or lock the hooks 22 and 23 against the bracket flange portions 26b. Where flush mounting of front panel 16 is desired or where the structure utilizes adjustable support brackets for the purpose of standardizing the construction, it is necessary to loosen nut 28 on each adjustable support bracket 25 so that the member 26 may be slid to its position farthest out of the enclosure 10. A notch 13A is provided in flange 13B of the sides 13 to slidably guide each member 26 so that the front panel 16 may be hung by hooks 22 and 23 on the adjustable support bracket flange portions 26b without causing rotation of any one of the members 26 about its mounting bolt 27. After attachment in this manner, the nuts 28 of mounting bracket 25 are loosened slightly after gaining access through the open door 17 and the front panel 16 is pressed into its desired ultimate position whereupon the nuts 28 are tightened to prevent any further movement of members 26. Alternatively, where a standard installation is involved, the final position of the member 26 may be adjusted immediately. The ultimate position may be flush with a wall which is supporting the enclosure 10 or may be abutting the front flange portions of housing 11. The procedure for locking front panel 16 in place is identical to that described above with respect to embodiments utilizing a fixed support bracket 25.

To detach the trim panel 16 from the housing 11, the door 17 is first opened, and then the locking screw 32 is turned out of engagement with locking bracket 31 and then the front panel 16 is lifted off the support brackets 25.

While I have disclosed only one embodiment of my invention, it will be appreciated that many modifications thereof may readily be made by those skilled in that art, and I therefore intend by the appended claims to cover all such modifications as fall within the true spirit and scope of my invention.

What I claim as new and desire to secure by Letters Patent of the United States is:

1. an electrical equipment enclosure comprising:
    a. a housing having a rear wall, a plurality of sidewalls, and an open front;
    b. front closure means for closing said open front of said housing comprising a substantially flat member having a door therein, said flat member having a rear surface and a front surface;
    c. means mounting said door on said flat member for movement between an open position and a closed position;
    d. at least one pair of support brackets carried by said housing said support brackets each having at least one generally planar surface disposed generally parallel to said front closure;
    e. at least one pair of hook members fixedly carried on said front closure engaging said support brackets;
    f. said support brackets being adjustable into and out of said enclosure in a direction normal to the plane of the open front of the housing.

2. An electrical equipment enclosure as set forth in claim 1 wherein at least one additional pair of support brackets and one additional pair of hook members are provided.

3. An electrical equipment enclosure as set forth in claim 1 wherein said enclosure also comprises locking means carried by said housing and movable between a first position in which it obstructs movement of said front closure means in a plane parallel to said plane of said open front of said housing to thereby prevent disengagement of said hooks from said support brackets and removal of said front closure means, and a second position in which it permits movement of said front closure means in a plane parallel to said plane of said open front of said housing at least enough to disengage said hook members from said support brackets.

4. An electrical equipment enclosure as set forth in claim 1 wherein said sidewalls of said housing include inwardly turned flanges having a plurality of notches, each of said notches slidably receiving a portion of one of said support brackets, and support means inside said housing slidably supporting each of said support brackets.

* * * * *